(12) United States Patent
Higgs et al.

(10) Patent No.: US 10,627,888 B2
(45) Date of Patent: Apr. 21, 2020

(54) PROCESSOR POWER-SAVING DURING WAIT EVENTS

(71) Applicant: International Business Machines Corporation, Armonk, NY (US)

(72) Inventors: Raymond M. Higgs, Poughkeepsie, NY (US); Luke M. Hopkins, Peterborough, NH (US); Mushfiq Saleheen, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/419,574

(22) Filed: Jan. 30, 2017

(65) Prior Publication Data
US 2018/0217655 A1    Aug. 2, 2018

(51) Int. Cl.
| | |
|---|---|
| *G06F 1/3234* | (2019.01) |
| *G06F 1/3206* | (2019.01) |
| *G06F 1/3287* | (2019.01) |
| *G06F 1/20* | (2006.01) |
| *G06F 1/3209* | (2019.01) |

(52) U.S. Cl.
CPC ............ *G06F 1/3234* (2013.01); *G06F 1/206* (2013.01); *G06F 1/3206* (2013.01); *G06F 1/3209* (2013.01); *G06F 1/3287* (2013.01); *Y02D 10/171* (2018.01)

(58) Field of Classification Search
None
See application file for complete search history.

(56) References Cited

U.S. PATENT DOCUMENTS

| | | | |
|---|---|---|---|
| 8,006,111 B1 * | 8/2011 | Faibish | G06F 1/3221 713/324 |
| 2006/0232809 A1 * | 10/2006 | Chapman | G06F 3/1206 358/1.13 |
| 2008/0098248 A1 | 4/2008 | Maher et al. | |

(Continued)

FOREIGN PATENT DOCUMENTS

| | | |
|---|---|---|
| TW | 200521709 A | 7/2005 |
| TW | 201626156 A | 7/2016 |

OTHER PUBLICATIONS

Search Report and Written Opinion for International Application No. PCT/EP2017/084258; International Filing Date: Dec. 21, 2017; dated Mar. 7, 2018; 15 pgs.

(Continued)

*Primary Examiner* — Paul Yen
(74) *Attorney, Agent, or Firm* — Cantor Colburn LLP; Steven Chiu (57) ABSTRACT

Embodiments are directed to a method of optimizing power consumption in an electrical device. The method includes receiving, by a processor, instructions to enter a wait state, and identifying, by the processor, a parameter associated with the instructions to enter a wait state. The method continues with initiating, by the processor, instructions to enter a low-power mode based on the parameter, initiating, by the processor, instructions to exit a low-power mode based on the parameter, and providing, via a user interface, a user with notice of a current state of the processor. The parameter includes runtime information, instructional information, and scheduled operations.

20 Claims, 6 Drawing Sheets

(56) References Cited

U.S. PATENT DOCUMENTS

| | | | |
|---|---|---|---|
| 2010/0077243 A1* | 3/2010 | Wang | G06F 1/3209 |
| | | | 713/323 |
| 2010/0293401 A1 | 11/2010 | De Casare et al. | |
| 2011/0154079 A1 | 6/2011 | Dixon et al. | |
| 2012/0287467 A1 | 11/2012 | Yamano | |
| 2013/0073884 A1 | 3/2013 | Ulmer et al. | |
| 2013/0246824 A1 | 9/2013 | Dixon et al. | |
| 2014/0304537 A1* | 10/2014 | Henderson | G06F 1/3275 |
| | | | 713/323 |

OTHER PUBLICATIONS

Chinese Office Action dated Apr. 17, 2018; 7 pgs.

* cited by examiner

SDI (SLEEP DECISION INDEX) FIELD

| | SLEEP Op CODE | PARAMETERS | STATE |
|---|---|---|---|
| 308 | NOP | NONE | NONE |
| 310 | GO TO SLEEP STATE IF N ops > set time | # ops, threshold | # of ops over threshold |
| 312 | GO TO SLEEP STATE IF exp. avg > threshold | avg., threshold | PREVIOUS calc. avg. |
| 314 | DO NOT ENTER SLEEP STATE IF ( PREV WAIT - K) < 0; EXIT SLEEP STATE AFTER (PREV WAIT - K) | K | PREVIOUS WAIT DURATION |
| 316 | DON'T GO TO SLEEP STATE IF N ops > thres. | # ops, threshold | # of ops < threshold |
| 318 | DON'T GO TO SLEEP STATE IF N ops < thres. | avg., threshold | PREVIOUS calc. avg. |

PROCESSOR POWER-SAVING DURING WAIT EVENTS

BACKGROUND

The present invention relates in general to reducing and controlling thermal dissipation as well as power consumption in a computer system or processor containing many transistors present in integrated circuits (ICs) that consume power when operating.

Typically, electrical devices employ clock gating and cycle steering to reduce power consumption when operating. As IC sizes diminish and circuit density increases, the corresponding power consumption and heat dissipation requirements also increase. It is highly desirable to minimize power consumption, especially when circuits and power-consuming logic blocks are in a wait state.

SUMMARY

Embodiments are directed to a method for optimizing power consumption in an electrical device. The method includes receiving, by a processor, instructions to enter a wait state, and identifying, by the processor, a parameter associated with the instructions to enter a wait state. The method also includes initiating, by the processor, instructions to enter a low-power mode based on the parameter, initiating, by the processor, instructions to exit the low-power mode based on the parameters, and providing, via a user interface, a user with notice of a current state of the processor.

Embodiments are also directed to a system that includes a memory having computer readable instructions and a processor for executing the computer readable instructions. The computer readable instructions include receiving instructions to enter a wait state and identifying a parameter associated with the instructions to enter a wait state. The computer readable instructions also include initiating instructions to enter a low-power mode based on the parameter, initiating, by the processor, instructions to exit the low-power mode based on the parameters, and providing, via a user interface, a user with notice of a current state of the processor.

Embodiments are also directed towards a computer program product including a computer readable storage medium containing program instructions, where the computer readable storage medium is not a transitory signal per se. The program instructions are executable by a computer processor and cause the computer processor to perform a method. The method includes receiving, by a processor, instructions to enter a wait state, and identifying, by the processor, a parameter associated with the instructions to enter a wait state. The method also includes initiating instructions to enter a low-power mode based on the parameter, initiating, by the processor, instructions to exit the low-power mode based on the parameters, and providing, via a user interface, a user with notice of a current state of the processor.

BRIEF DESCRIPTION OF THE DRAWINGS

The subject matter of the present invention is particularly pointed out and distinctly defined in the claims at the conclusion of the specification. The foregoing and other features and advantages are apparent from the following detailed description taken in conjunction with the accompanying drawings in which:

DETAILED DESCRIPTION

Various embodiments of the present invention are described herein with reference to the related drawings. Alternative embodiments can be devised without departing from the scope of this invention. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The term "one or more" is understood to include any integer number greater than or equal to one, i.e. one, two, three, four, etc. The term "a plurality" is understood to include any integer number greater than or equal to two, i.e. two, three, four, five, etc. The term "connection" can include an indirect "connection" and a direct "connection".

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, where intervening elements such as an interface structure can be present between the first element and the second element. The term "direct contact" means that a first element (such as a first structure) and a second element (such as a second structure) are connected to one another without any intermediary layers at the interface of the two elements.

Turning now to an overview of the present invention, the methods and devices described herein include a power-saving event process to control power consumption. This invention includes a computer system (processor), already in a wait state, which sends instructions to elements of the processor to enter a low-power (power-saving) state, thus conserving power and reducing heat generation. In order for the power-saving state to commence, the processor must first be in a wait state. The processor enters a wait state depending on the current workload and program flow, and is not dependent upon power consumption parameters.

Figure 1:
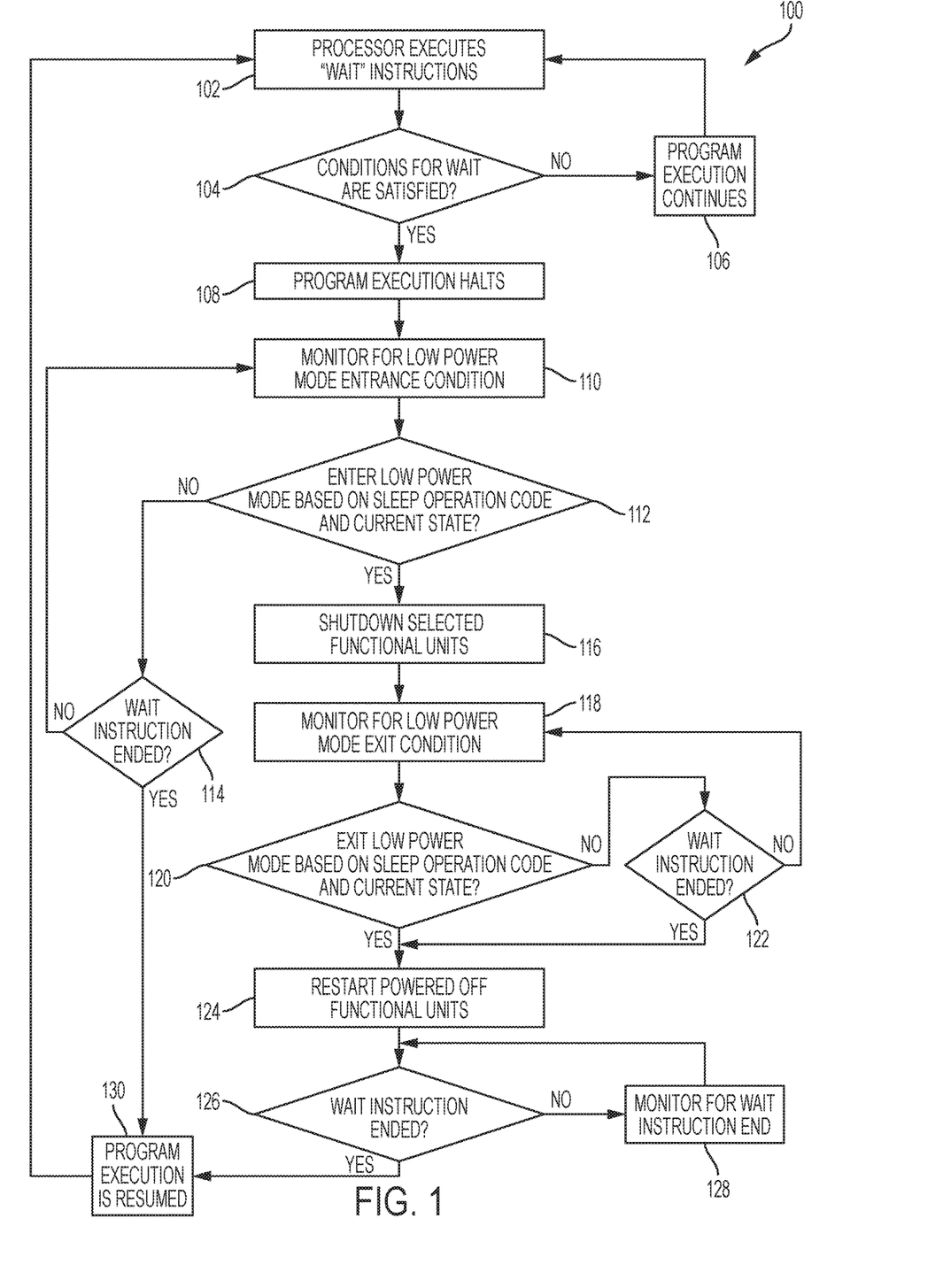
FIG. 1 depicts a flowchart showing a power-saving event process to control power consumption according to one or more embodiments of the present invention.

Turning now to a more detailed description of embodiments of the present invention, FIG. 1 depicts a flowchart 100 showing a power-saving process to control power consumption according to one or more embodiments of the present invention. The process 100 includes a processor executing "wait" instructions (entering a wait state) 102, a decision block 104 whether the conditions to continue in a wait state are satisfied, a process for the program execution to continue at block 106 if the conditions at block 104 are not satisfied, a step to halt program execution at block 108 if the conditions of block 104 are satisfied, and monitoring for low power mode entrance conditions at block 110. The flowchart 100 continues with a decision to enter a low power mode based on the sleep operation code (described further in FIG. 2) and current state at block 112, a decision block determining whether the wait instruction has ended at block 114, a process to shut down selected functional units at block 116 if the decision at block 112 is "YES", a process for monitoring low power mode exit conditions at block 118, and a decision block at block 120 to determine whether to exit low power mode based on the sleep operation code (discussed in FIG. 2) and current state. The flowchart 100 continues with a decision block at block 122 asking whether the wait instruction has ended based on a "NO" response from block 120, a process to restart powered-off functional units at block 124 if the answer at decision block 120 is "YES", a decision block 126 that asks whether the wait instruction has ended, a process to monitor for the wait instruction to end at block 128 if the answer to decision block 126 is "NO", and a process to resume program execution at block 130 if the answer to decision block 126 is "YES".

Once the processor is in a wait state at block 108, the processor makes a decision at block 112 to enter a power-saving state or low power mode. This is accomplished by the processor sending instructions to power down or reduce power consumption of selected circuitry and logic blocks at block 116. The decision to enter a power-saving state as shown at block 116 is based on several parameters as described in FIG. 3. Regardless if the processor decides to enter or not enter a power-saving state, the processor continues operating in a wait state. The processor has the ability of entering a wait state independently of operating in a power-saving state. However, the processor can enter the power-saving state only when the processor is already in a wait state. Furthermore, when the processor exits a wait state, the power-saving state also ends. The flowchart 100 continues with block 112 which includes the computer system monitoring system parameters to determine whether to continue or end the wait state. The process continues with block 116, where pre-selected circuitry and logic blocks are shut down or instructed to enter a power-saving state. The flowchart 100 also includes a decision block 120, where the processor decides whether to continue with the power-saving state or to exit the power-saving state. This decision at block 120 includes analyzing the computer system parameters at block 118. The processor continues to enable the power-saving state at block 120 until such time when a set of monitored parameters changes state at block 118, for example when a triggering event goes away, when the processor sends instructions to exit the power-saving state, or when the processor exits the wait state at block 122. Once the decision to exit the low-power state is made at block 120, the process restarts the powered-off functional units at block 124 and then monitors for a command to end the wait state at block 126. Once the command to exit the wait state is received at block 126, program execution resumes at 130 and the process restarts at block 102.

Figure 2:
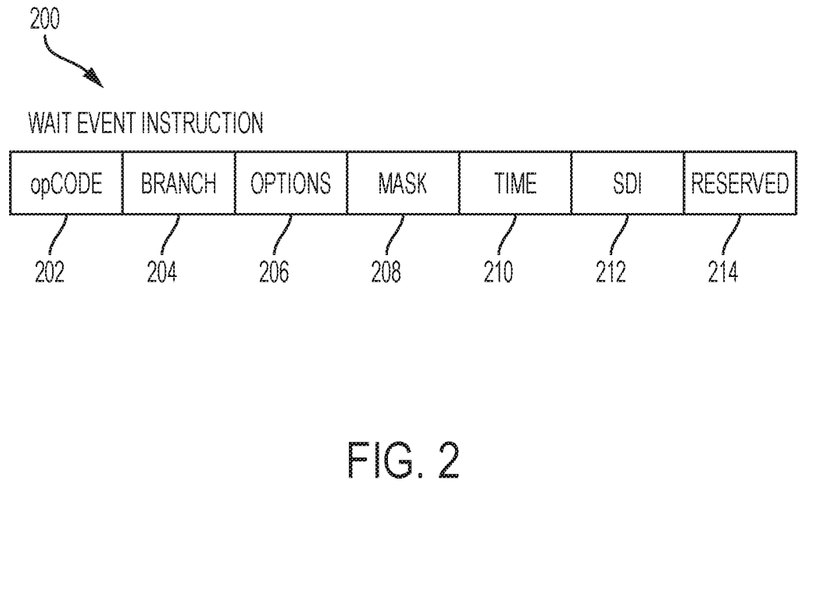
FIG. 2 depicts an encoded wait event instruction set according to one or more embodiments of the present invention.

FIG. 2 depicts an encoded wait event instruction set 200 according to one or more embodiments of the present invention. Example instruction set 200 has a plurality of fields labeled as opcode field 202, branch field 204, options field 206, mask field 208, time field 210, hints field (also known as sleep decision index (SDI)) 212, and Reserved field 214. The opcode field 202 uniquely identifies the wait event instruction set within the instruction set 200. There can be several variations of wait events, including some operands that references registers and some that receive and process immediate operands. The branch field 204 specifies the location where the program should branch to whenever an error occurs. One example error is a timeout event. The branch field 204 can also include absolute or relative addressing. The options field 206 encodes how the set of triggering events waited for will be handled. In some embodiments, it is desirable to wait for a period of time until bits representing an available resource are set or cleared. In some embodiments, it is desirable to wait until all bits or only a single bit representing some resource changes state. Some resources can be represented by a single bit and do not require a mask as further described below. In those embodiments, such resources can be represented in the options field 206 succinctly. Meanwhile, the mask field 208 encodes abundant resources. As an example, an input/output (IO) controller can have multiple Direct Memory Access (DMA) operations outstanding at once. If each DMA operation is encoded as a single bit, a wait can be present for the $1^{st}$ and $3^{rd}$ DMA operations. Meanwhile, the $2^{nd}$ DMA operation is ignored. The mask field 208 can also be encoded with a "101b" mask ("b" signifying a binary mask). The use of the mask field 208 does not block operations; rather, it identifies those operations that will not be considered in the decision to exit the wait state. The wait event instruction 200 also includes the time field 210 which encodes the maximum time interval for the processor to wait. When the system has waited the set amount of time for the triggering event to occur, it will then reference the branch field 204 operand. The branch field 204 operand will then be used to load the program counter. In some embodiments, a program counter of zero can be encoded to wait forever. Also in some embodiments, the time field 210 can also be set to 0 in order to wait forever. The SDI field 212 includes bits to select options including, but not limited to, "always power save", "never power save", etc. The SDI field 212 is used to control entry and exit of the power-saving state and contains additional information that the software developer would like to pass to the hardware and is discussed in more detail in FIG. 3.

Figure 3:
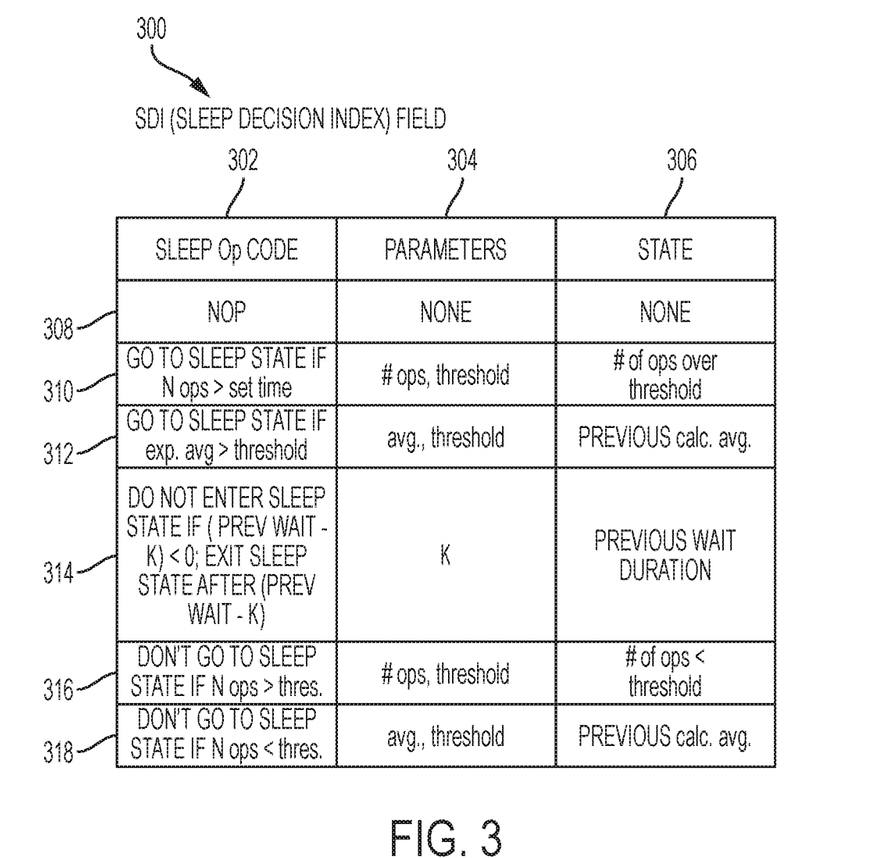
FIG. 3 depicts a sleep decision index field of the wait event instruction set according to one or more embodiments of the present invention.

FIG. 3 depicts a sleep decision index (SDI) field 300 of the wait event instruction set according to one or more embodiments of the present invention. The SDI field (table) 300 is one field of the wait event instruction 200 of FIG. 2. The SDI table 300 includes a sleep operation (Op) code 302, parameters 304, and a state 306. Each of the table entries controls a state machine which is associated with a SDI table 300 entry. The information in a particular SDI table 300 entry controls when the power-saving state is entered and when the power-saving state is exited. The programmer sets the values of the SDI table 300 in the wait event instruction 200. The programmer also configures the Sleep Operation Code 302 and parameters 304 for each entry in the SDI table 300. A given SDI table 300 entry can be referred to by more than one wait event instruction as appropriate. The Sleep Operation Code 302 specifies which algorithm should be applied. Some example algorithms include, but are not limited to, the following: no operations (NOP) 308, where the device does not enter the power-saving state for any reason, and includes parameters (none) and state (none). Another example algorithm is time delay 310, where the SDI field 300 sends instructions to enter a power-saving state if the previous consecutive N wait states have taken longer than a specified threshold parameter. The parameters include a number of operations and a threshold value. The state includes a current number of prior consecutive operations exceeding a threshold. Another example algorithm includes exceeding an average threshold 312. This SDI field has a Sleep Op Code 302 that specifies entering a power savings state if the exponential moving average of wait event times exceeds a threshold. The exponential moving average is defined as:

$$\text{last\_measured\_wait\_time}*a+(1-a)*\text{previous\_calculated\_exponential\_average} \qquad \text{Eq. 1}$$

The parameters include a weighting parameter "a" and a threshold. The state includes the previously calculated average. Another example algorithm includes another time delay$_2$ 314, where the power savings state is exited after a predetermined time (previous wait duration—K timer ticks). When this value <=0, then the device does not enter a power-saving state and maintains its present state indefinitely. The parameter includes the value "K" while the state includes the previous wait duration. Another example algorithm includes not entering a power-saving state if the number of previous consecutive N operations does not exceed a predetermined threshold 316. The parameters include a number of operations N and a threshold value. The state includes the current number of consecutive operations less than the threshold. Finally, another example algorithm includes not entering a power-saving state if the exponential moving average is less than a threshold 318. The parameters include a weighting parameter "a" and a predetermined threshold value. The state includes a previously calculated average. These are just a sample of possible algorithms and are not limiting. Other embodiments are possible depending on the system being used and the needs of the operator or programmer. The SDI field 300 algorithms 308, 310, 312, 314, 316, and 318 can be implemented by processing element microcode or on hardware state machines. The entry and exit of power-saving states can occur at any point within an active wait state interval. Other algorithms are possible and are not limited to the embodiments described above.

Figure 4:
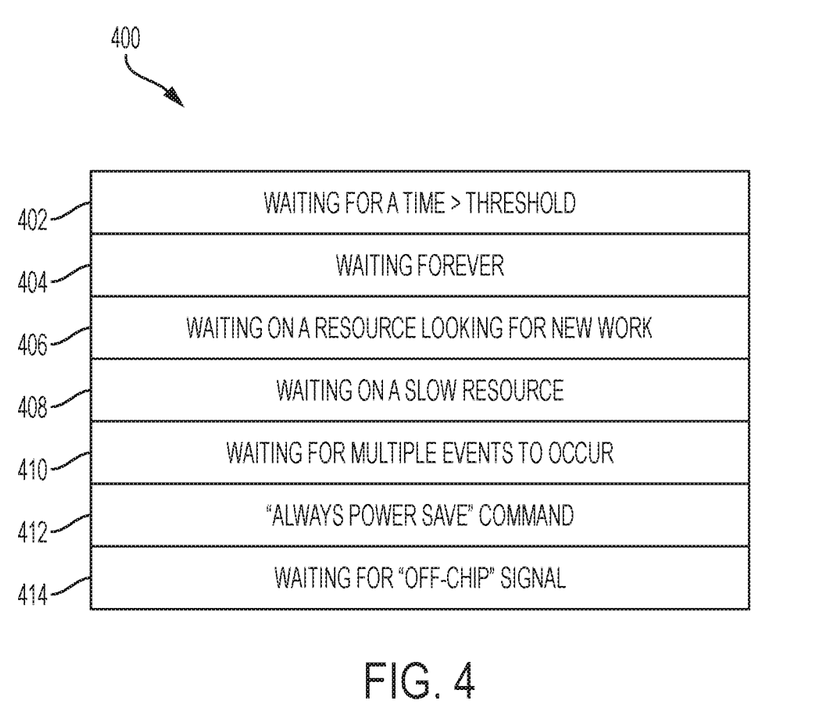
FIG. 4 depicts a chart of alternative instructions triggered by the occurrence of a triggering event according to one or more embodiments of the present invention.

FIG. 4 depicts a flowchart of alternative instruction sets 400 triggered by the occurrence of a triggering event according to one or more embodiments of the present invention. The options mask field, time field, and SDI field operands all encode information that the hardware uses to conserve power and reduce heat generation. Some of the information is implicit and some is explicit (e.g. the SDI field operand). Several trigger events 402 that would trigger entry into a power-saving state include waiting for a time greater than a threshold 404, waiting forever 406, waiting on a resource that is deemed as the application looking for new work 408, waiting on a resource that is too slow 410, waiting for multiple events to occur 412, employing an "always power save" command 414, and waiting for an "off-chip" signal 416. Different conditions can trigger different entries into a power saving state. As an example, the "wait forever 406" trigger event might clock gate some or all of the processor circuitry. Alternatively, waiting on a high-speed bus might only throttle the clock speed of the processor. Some conditions can be set up to not trigger a power-saving event, such as waiting for an event that has already occurred, waiting for a time less than a set threshold, or waiting while a "never power save" command is in effect. The current embodiment is a wait event instruction. However, other embodiments are possible as well. These include, but are not limited to, system calls, other software constructs such as mutexes (a program object that allows multiple program threads to share the same resource, such as file access), locks, conditional variables, etc. These and other embodiments can implement equivalent functions, and can use many more instructions to do so.

Figure 5:
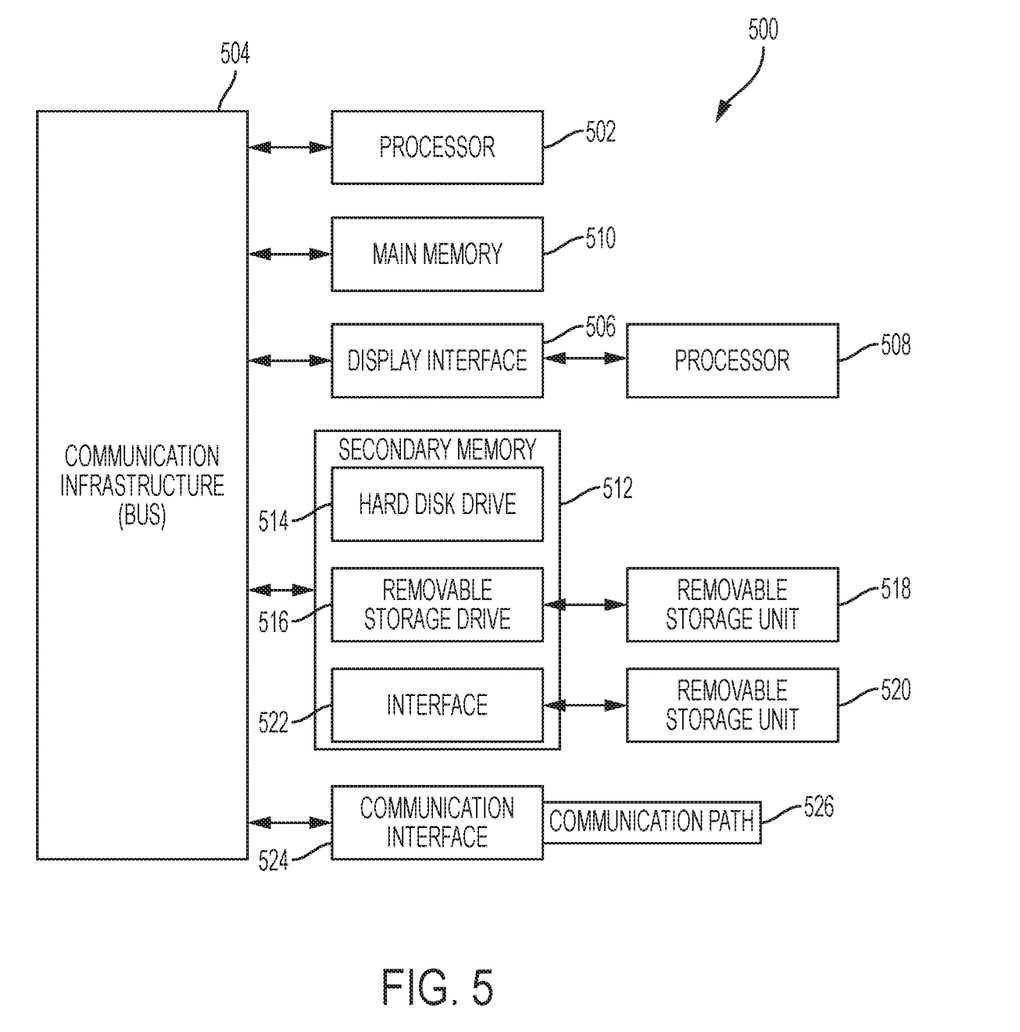
FIG. 5 depicts a high-level block diagram of a computer system according to one or more embodiments of the present invention.

FIG. 5 depicts a high-level block diagram of a computer system 500, which can be used to implement one or more embodiments. More specifically, computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional systems are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512.

Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 6:
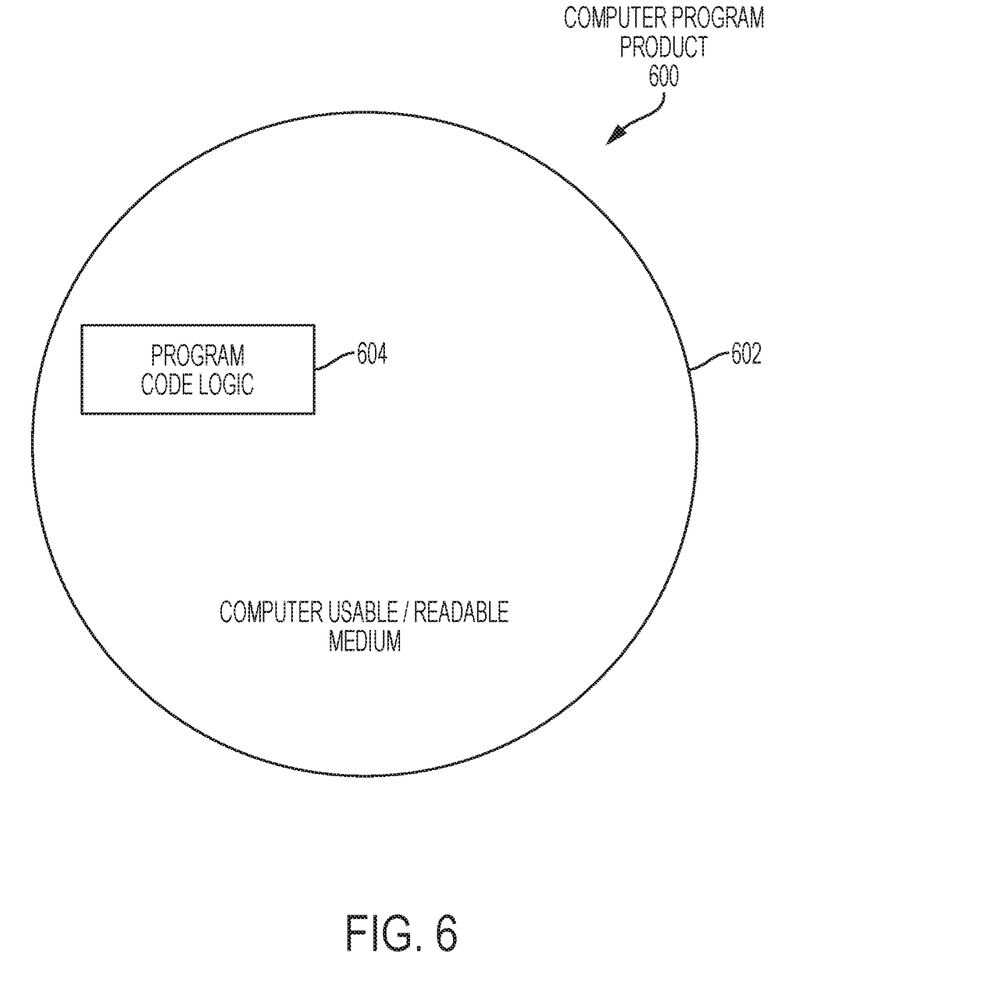
FIG. 6 depicts a computer program product that includes a computer-readable storage medium and program instructions according to one or more embodiments of the present invention.

Referring now to FIG. 6, a computer program product 600 in accordance with an embodiment that includes a computer-readable storage medium 602 and program instructions 604 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the operator's computer, partly on the operator's computer, as a stand-alone software package, partly on the operator's computer and partly on a remote computer or entirely on the remote computer or server. In the latter scenario, the remote computer can be connected to the operator's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The corresponding structures, materials, acts, and equivalents of all means or step plus function elements in the claims below are intended to include any structure, material, or act for performing the function in combination with other claimed elements as specifically claimed. The present invention has been presented for purposes of illustration and description, but is not intended to be exhaustive or limited to the form described. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the functionality and operation of possible implementations of systems and methods according to various embodiments of the present invention. In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. The actions can be performed in a differing order or actions can be added, deleted or modified. Also, the term "coupled" describes having a signal path between two elements and does not imply a direct connection between the elements with no intervening elements/connections therebetween. All of these variations are considered a part of the invention.

The terms "about," "substantially," "approximately," and variations thereof, are intended to include the degree of error associated with measurement of the particular quantity hosted upon the equipment available at the time of filing the application. For example, "about" can include a range of ±8% or 5%, or 2% of a given value.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present invention has been described in detail in connection with only a limited number of embodiments, it should be readily understood that the present invention is not limited to such described embodiments. Rather, the present invention can be modified to incorporate any number of variations, alterations, substitutions or equivalent arrangements not heretofore described, but which are commensurate with the spirit and scope of the present invention. Additionally, while various embodiments of the present invention have been described, it is to be understood that aspects of the present invention can include only some of the described embodiments. Accordingly, the present invention is not to be seen as limited by the foregoing description, but is only limited by the scope of the appended claims.

What is claimed is:

1. A method of optimizing power consumption in an electrical device, the method comprising:
   receiving, by a processor, instructions to enter a wait state, wherein the instructions include a sleep decision index comprising a sleep operation code, a parameter and a state;
   monitoring, by the processor, the parameter specified by the sleep decision index;
   initiating, by the processor, instructions to enter a low-power mode based on a determination that the parameter has met a value specified by the sleep decision index, wherein the value is determined based on a history of previous events or states and wherein the determination is based on applying an algorithm specified by the sleep operation code to the parameter;
   initiating, by the processor, instructions to exit the low-power mode based on the parameter; and
   providing, via a user interface, a user with notice of a current state.

2. The method of claim 1, wherein the parameter includes dynamically changing thresholds based on a history of previous events or states.

3. The method of claim 1, wherein the instructions to enter and exit a low-power mode are sent to predetermined circuits in the electrical device.

4. The method of claim 1, wherein the processor contains a predetermined set of instructions to enter and exit a low-power mode based on the parameter identified.

5. The method of claim 1, wherein the parameter is accessed from a remote location.

6. The method of claim 1, wherein the instructions to enter and exit a low-power mode include delaying, for a predetermined time, a start of an event.

7. The method of claim 1, wherein the instructions to enter a low-power mode include, after a predetermined time period, ordering a hardware device to transition from a low-power mode to routine operations.

8. The method of claim 1, wherein the parameter can be passed as operands of the instructions.

9. The method of claim 1, wherein the instructions to enter and exit a low-power mode include executing a delaying action for a predetermined amount of time before entering or exiting a low-power mode.

10. The method of claim 1, wherein the algorithm specifies entering the low-power mode based on a determination that the parameter, which contains an exponential moving average of wait event times for an instruction, exceeds a threshold.

11. The method of claim 10, wherein the algorithm further includes a time delay for exiting the low-power mode.

12. A system, comprising:
    a memory having computer readable instructions; and
    a processor for executing the computer readable instructions, the computer readable instructions including:
       receiving instructions to enter a wait state, wherein the instructions include a sleep decision index comprising a sleep operation code, a parameter and a state;
       monitoring a parameter specified by the sleep decision index to enter a wait state;
       initiating instructions to enter a low-power mode based on a determination that the parameter has met a value specified by the sleep decision index, wherein the value is determined based on a history of previous events or states and wherein the determination is based on applying an algorithm specified by the sleep operation code to the parameter;
       initiating instructions to exit a low-power mode based on the parameter; and
       providing, via a user interface, a user with notice of a current state.

13. The system of claim 12, wherein the instructions to enter and exit a low-power mode are sent to predetermined circuits in the electrical device.

14. The system of claim 12, wherein the processor contains a predetermined set of instructions to enter and exit a low-power mode based on the parameter identified.

15. The system of claim 12, wherein the instructions to enter and exit a low-power mode include delaying, for a predetermined time, a start of an event.

16. The system of claim 12, wherein the instructions to enter a low-power mode include executing a delaying action for a predetermined amount of time before entering a low-power mode.

17. A computer program product comprising a computer readable storage medium having program instructions embodied therewith, the program instructions executable by a computer processor to cause the computer processor to perform a method comprising:
    receiving, by a processor, instructions to enter a wait state, wherein the instructions include a sleep decision index comprising a sleep operation code, a parameter and a state;
    monitoring, by the processor, a parameter specified by the sleep decision index to enter a wait state;
    initiating instructions to enter a low-power mode based on a determination that the parameter has met a value specified by the sleep decision index, wherein the value is determined based on a history of previous events or states and wherein the determination is based on applying an algorithm specified by the sleep operation code to the parameter;
    initiating instructions to exit a low-power mode based on the parameter; and
    providing, via a user interface, a user with notice of a current state.

18. The computer program product of claim 17, wherein the instructions to enter and exit a low-power mode are sent to predetermined circuits in the electrical device.

19. The computer program product of claim 17, wherein the processor contains a predetermined set of instructions to enter and exit a low-power mode based on the parameter identified.

20. The computer program product of claim 17, wherein the instructions to enter and exit a low-power mode include delaying, for a predetermined time, a start of an event.

* * * * *